(12) United States Patent
Lin

(10) Patent No.: US 7,357,347 B2
(45) Date of Patent: Apr. 15, 2008

(54) TAPE MEASURE

(75) Inventor: Ping-Lin Lin, Sanchung (TW)

(73) Assignee: Top-Long Industrial Co., Ltd., Taipei Hsien (TW)

( * ) Notice: Subject to any disclaimer, the term of this patent is extended or adjusted under 35 U.S.C. 154(b) by 334 days.

(21) Appl. No.: 11/180,519

(22) Filed: Jul. 14, 2005

(65) Prior Publication Data

US 2007/0012812 A1    Jan. 18, 2007

(51) Int. Cl.
   *B65H 75/30*   (2006.01)
(52) U.S. Cl. .................. 242/385.4; 33/761; 33/767
(58) Field of Classification Search ............. 242/379, 242/385.4; 33/761, 767
   See application file for complete search history.

(56) References Cited

U.S. PATENT DOCUMENTS

| 4,131,244 | A | * | 12/1978 | Quenot | 242/381.3 |
| 4,449,302 | A | * | 5/1984 | Drechsler et al. | 33/767 |
| 4,976,048 | A | * | 12/1990 | Blackman | 33/767 |
| 4,998,356 | A | * | 3/1991 | Chapin | 33/767 |
| 5,001,843 | A | * | 3/1991 | Chapin | 242/381.3 |
| 5,007,178 | A | * | 4/1991 | Dewire et al. | 33/767 |
| 5,245,761 | A | * | 9/1993 | Waldherr | 242/384.7 |
| 5,379,523 | A | * | 1/1995 | Wingert | 33/767 |
| 5,400,521 | A | * | 3/1995 | Waldherr | 33/767 |
| 6,276,071 | B1 | * | 8/2001 | Khachatoorian | 33/767 |
| 6,470,590 | B1 | * | 10/2002 | Lee | 33/767 |
| 6,490,809 | B1 | * | 12/2002 | Li | 33/767 |

\* cited by examiner

*Primary Examiner*—Peter M. Cuomo
*Assistant Examiner*—Sang Kim
(74) *Attorney, Agent, or Firm*—Troxell Law Office, PLLC

(57) ABSTRACT

A tape measure of the present invention includes a casing formed by two covers. An outlet is defined in one side of the casing. A tape coiling is received in the casing. An end of the tape coiling extends from the outlet. A push button is movably disposed at a side edge of the casing corresponding to the outlet of the casing. A pivot portion extends from an end of the push button adjacent to the outlet. A control member is movably disposed in the casing adjacent to the outlet. The control member is pivotably connected with the pivot portion of the push button.

3 Claims, 5 Drawing Sheets

TAPE MEASURE

BACKGROUND OF THE INVENTION (a) Field of the Invention

The present invention relates to a tape measure, and particularly to a tape measure stably stopping a tape coiling thereof when the tape coiling is drawn from a casing of the tape measure.

(b) Description of the Prior Art

Referring to FIG. 5, a conventional tape measure includes a casing 5 with an outlet 13 being defined in one side of the casing 5. A tape coiling 6 is received in the casing 5 with an end thereof extending from the outlet 13. A push button 7 is pivotably disposed at an side edge of the casing 5 corresponding to the outlet 51. A stop member 8 is jointed with the push button 7. Mateable dentate portions 71, 81 are respectively disposed at the push button 7 and the stop member 8. In use, the push button 7 is pushed downwardly, the dentate portion 71 of the push button 7 mates with the dentate portion 81 of the stop member 8 for rotating the stop member 8 whereby the stop member 8 presses on the tape coiling 6. Thus, the tape coiling 6 is positioned at a desired scale. When the tape coiling 6 is drawn back, the push button 7 is pushed upwardly, the dentate portion 71 of the push button 7 mates with the dentate portion 81 of the stop member 8 for rotating the stop member 8 whereby the stop member 8 departs from on the tape coiling 6. Thus, the tape coiling 6 is reeled in the casing 5.

The conventional tape measure can work through the engagement of the dentate portions 71, 81 of the push button 7 and the stop member 8. However, since the push button 7 and the stop member 8 are made of plastic, the dentate portions 71, 81 thereof are easily damaged due to abrasion after a term of use, which results that the dentate portion 71 of the push button 7 cannot well and truly mate with the dentate portion 81 of the stop member 8. Therefore, the push button 7 cannot exactly rotate the stop member 8 to press on the tape coiling 6, which results in failure in positioning the tape coiling 6. Thus, the conventional tape measure is inconvenient for use.

SUMMARY OF THE INVENTION

Accordingly, an object of the present invention is to provide a tape measure which has a control member pivotably connected with an end of a push button to press on a tape coiling thereby stably stopping the tape coiling in an outlet at a desired length.

To achieve the above object, a tape measure of the present invention includes a casing formed by two covers. An outlet is defined in one side of the casing. A tape coiling is received in the casing. An end of the tape coiling extends from the outlet. A push button is movably disposed at a side edge of the casing corresponding to the outlet of the casing. A pivot portion extends from an end of the push button adjacent to the outlet. A control member is movably disposed in the casing adjacent to the outlet. The control member is pivotably connected with the pivot portion of the push button.

Other objects, advantages and novel features of the present invention will be drawn from the following detailed embodiment of the present invention with attached drawings, in which:

DESCRIPTION OF THE PREFERRED EMBODIMENT

Figure 1:
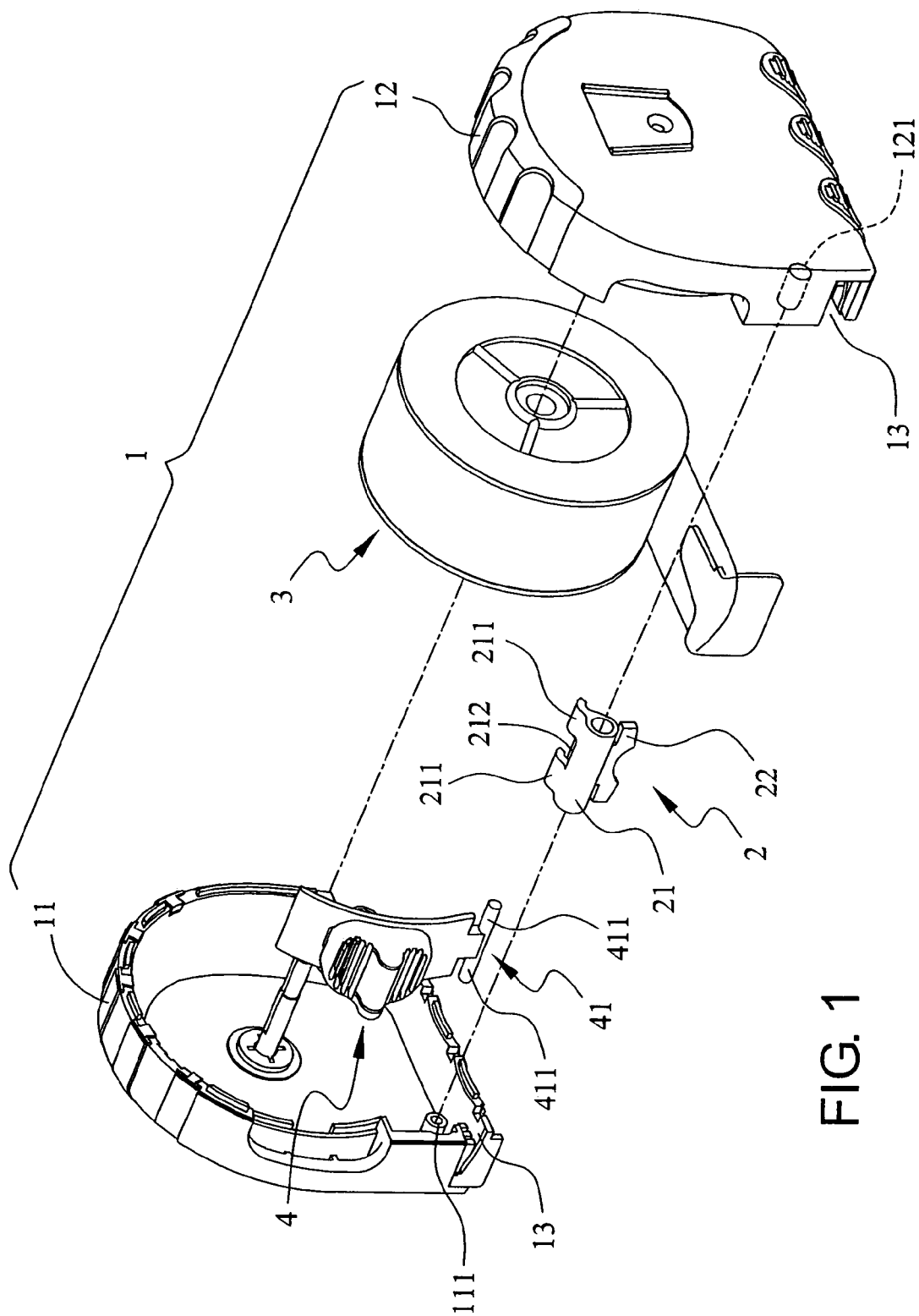
FIG. 1 is an exploded view of a tape measure of the present invention.
Figure 2:
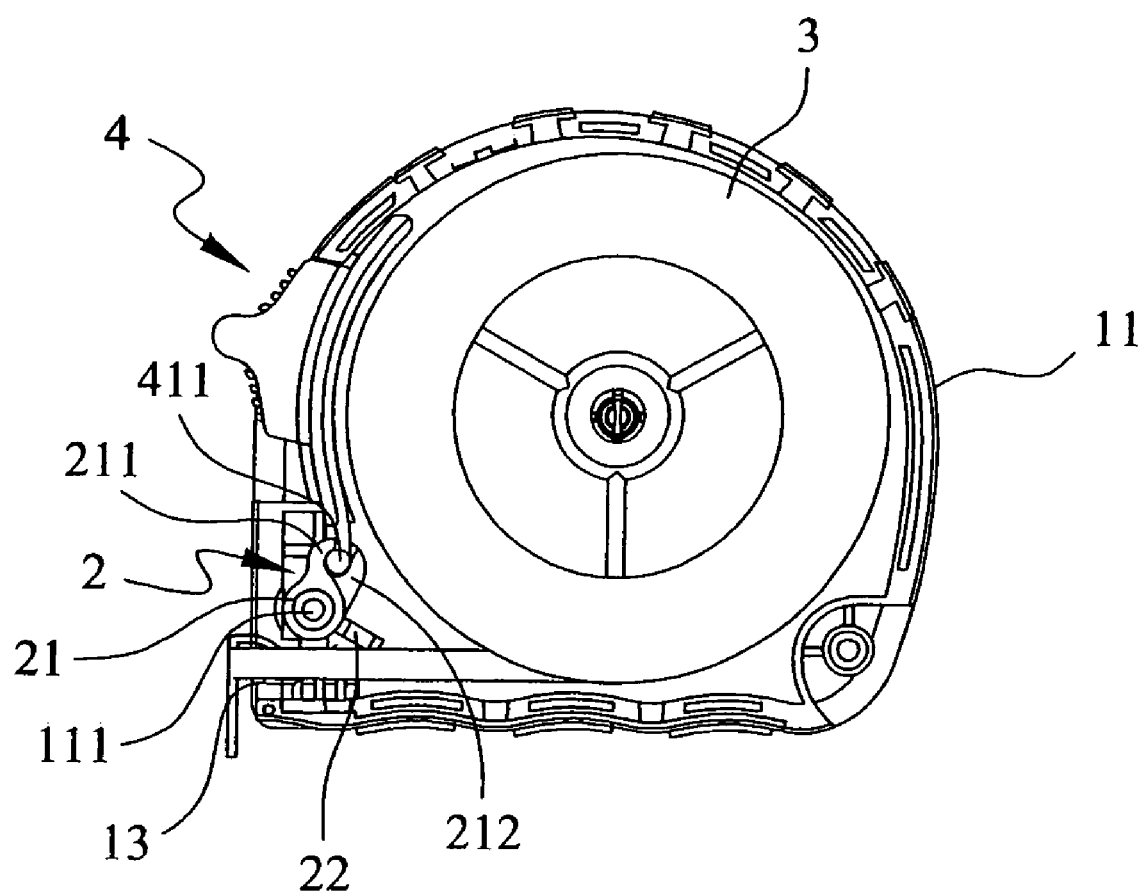
FIG. 2 is a cross-sectional view of an assembly of FIG. 1.

Referring to FIGS. 1-2, a tape measure of the present invention includes a casing 1 formed by two covers 11, 12. An outlet 13 is defined in one side of the casing 1. A tape coiling 3 is received in the casing 1 with an end thereof extending from the outlet 13. Two posts 111, 121 are respectively disposed at the two covers 11, 12 of the casing 1 adjacent to the outlet 13. A control member 2 is pivotably disposed between the posts 111, 121. The control member 2 includes a sleeve 21, and a press portion 22 disposed at a side edge of the sleeve 21 corresponding the tape coiling 3 in the outlet 13. The sleeve 21 includes two wings 211 at opposite ends thereof and slightly perpendicular to the press portion 22. A hook 212 is formed between the two wings 211 and perpendicular to the press portion 22. A push button 4 is pivotably disposed at a side edge of the casing 1 corresponding to the outlet 13 of the casing 1. A pivot portion 41 extends from an end of the push button 4 adjacent to the outlet 13. The pivot portion 41 includes two shafts 411 laterally extending from opposite sides of the end of the push button 4. The shafts 411 are pivotably disposed between the wings 211 land the hook 212 thereby the pivot portion 41 is pivotable about the control member 2.

Figure 3:
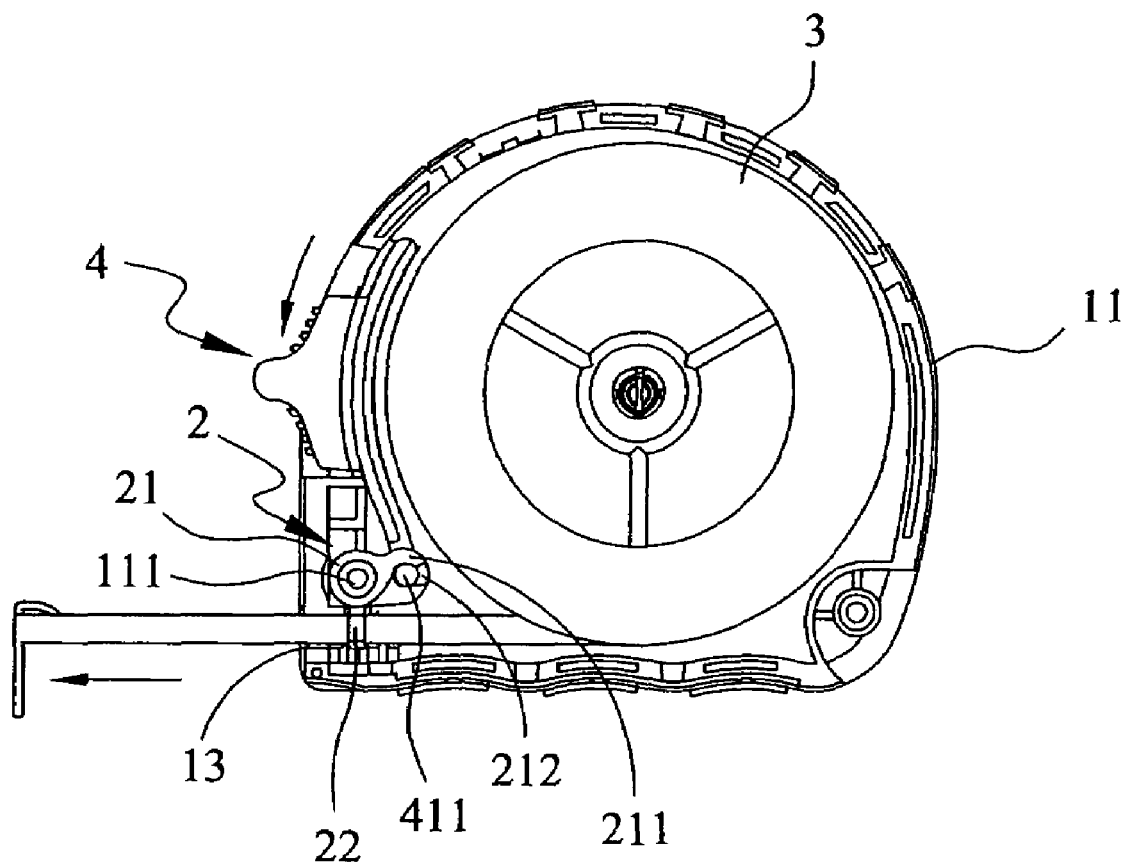
FIG. 3 is similar to FIG. 2 showing to stop a tape coiling.

Referring to FIG. 3, in use, an end of the tape coiling 3 is drawn from the outlet 13 of the casing 1. When the tape coiling 3 is drawn to a desired length (scale) and it is desired to stop the tape coiling 3, the push button 4 is pushed downwardly whereby the end of the push button 4 between the shafts 411 of the pivot portion 41 exerts a downward pressure to the hook 212 of the control member 2, Which causes the sleeve 21 of the control member 2 to rotate about the posts 111, 121 of the covers 11, 12. Thus, the press portion 22 perpendicular to the hook 212 rotates to press on the tape coiling 3 in the outlet 13 thereby stopping the tape coiling 3 at a desired length (scale).

Figure 4:
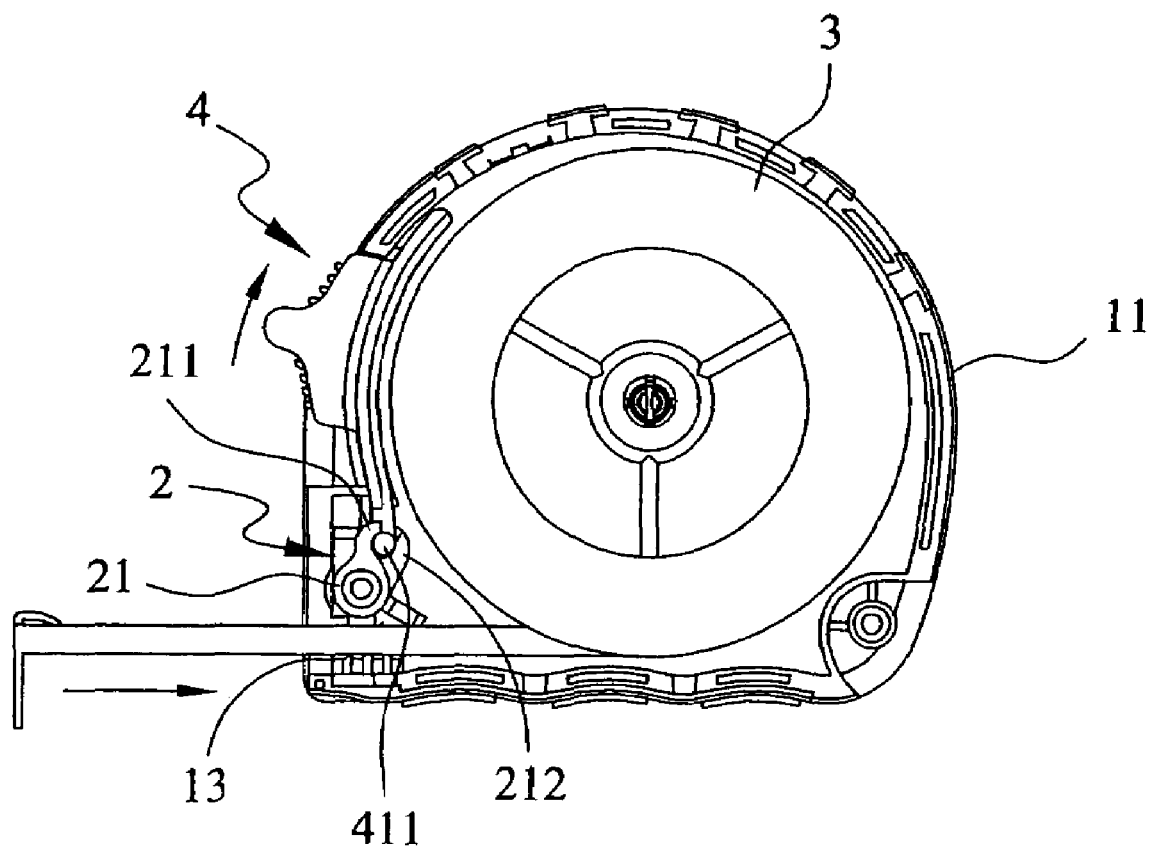
FIG. 4 is similar to FIG. 2 but showing to draw back the tape coiling.
Figure 5:
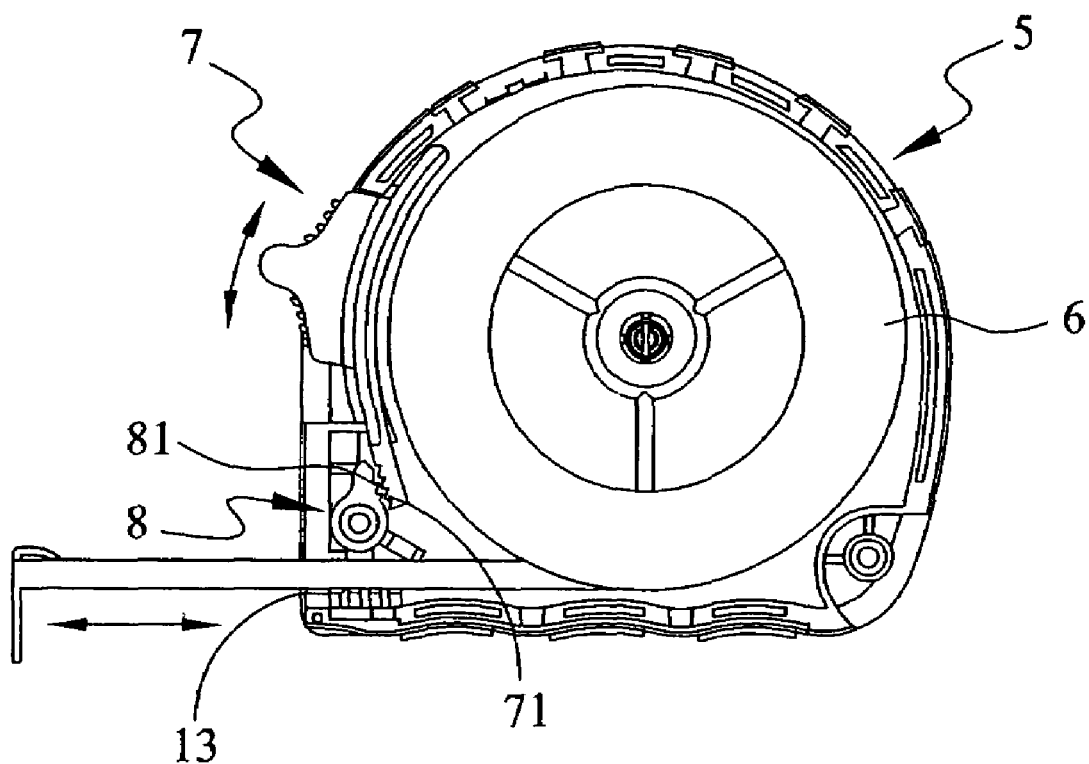
FIG. 5 is a cross-sectional view showing a use status of a conventional tape measure.

Referring to FIG. 4, when a user wants to draw back the tape coiling 3, the push button 4 is pushed upwardly whereby the shafts 411 of the pivot portion 41 exert an upward force to the wings 211 of the control member 2, which causes the sleeve 21 of the control member 2 to rotate about the posts 111, 121 of the covers 11, 12. Therefore, the press portion 22 slightly perpendicular to the wings 211 rotates to depart from the tape coiling 3 in the outlet 13 thereby drawing back the tape coiling 3 in the casing 1.

While the preferred embodiment of the invention has been set forth for the purpose of disclosure modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A tape measure comprising a casing formed by two covers, an outlet being defined in one side of the casing, a tape coiling being received in the casing, an end of the tape coiling extending from the outlet, a push button being movably disposed at a side edge of the casing corresponding to the outlet of the casing, wherein:

a pivot portion extending from an end of the push button adjacent to the outlet; and a control member being movably disposed in the casing adjacent to the outlet, the control member being piv otably connected with the pivot portion of the push button, wherein the control member includes a sleeve, and a press portion disposed at one side edge of the sleeve corresponding to the outlet, two wings extend from opposite ends of the sleeve and are slightly perpendicular to the press portion, a hook is defined between the wings and is perpendicular to the press portion, and the pivot portion is disposed between the wings and the hook.

2. The tape measure as claimed in claim 1, wherein the pivot portion includes two shafts extending from opposite sides of the end of the push button.

3. The tape measure as claimed in claim 1, wherein two posts respectively extend from the covers of the casing adjacent to the outlet for movably connecting with the control member.

* * * * *